Figure 1:
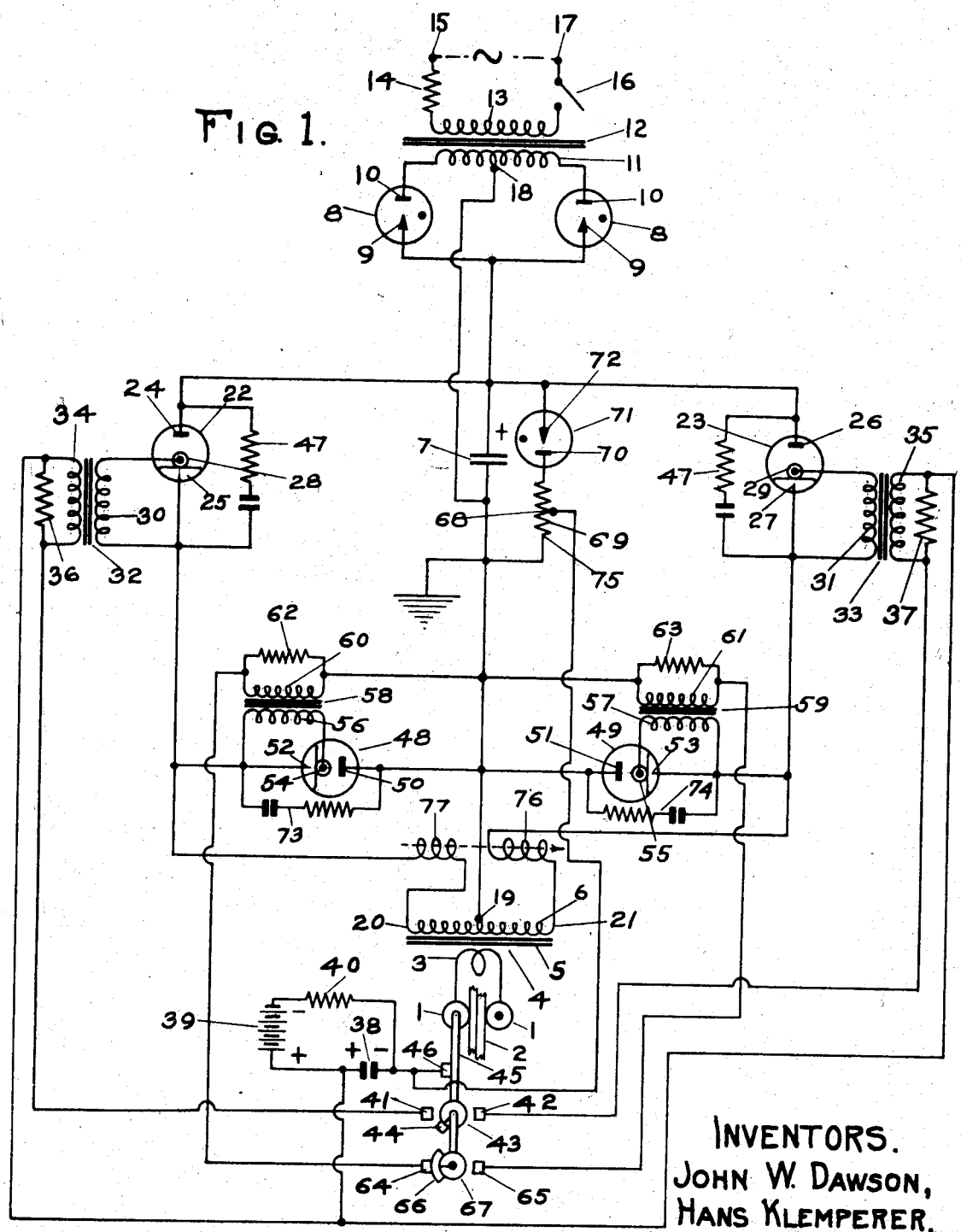

Aug. 28, 1945.  J. W. DAWSON ET AL  2,383,473
WELDING SYSTEM
Filed March 14, 1942   2 Sheets-Sheet 1

INVENTORS.
JOHN W. DAWSON,
HANS KLEMPERER.
BY Elmer J. Gorn
ATTY.

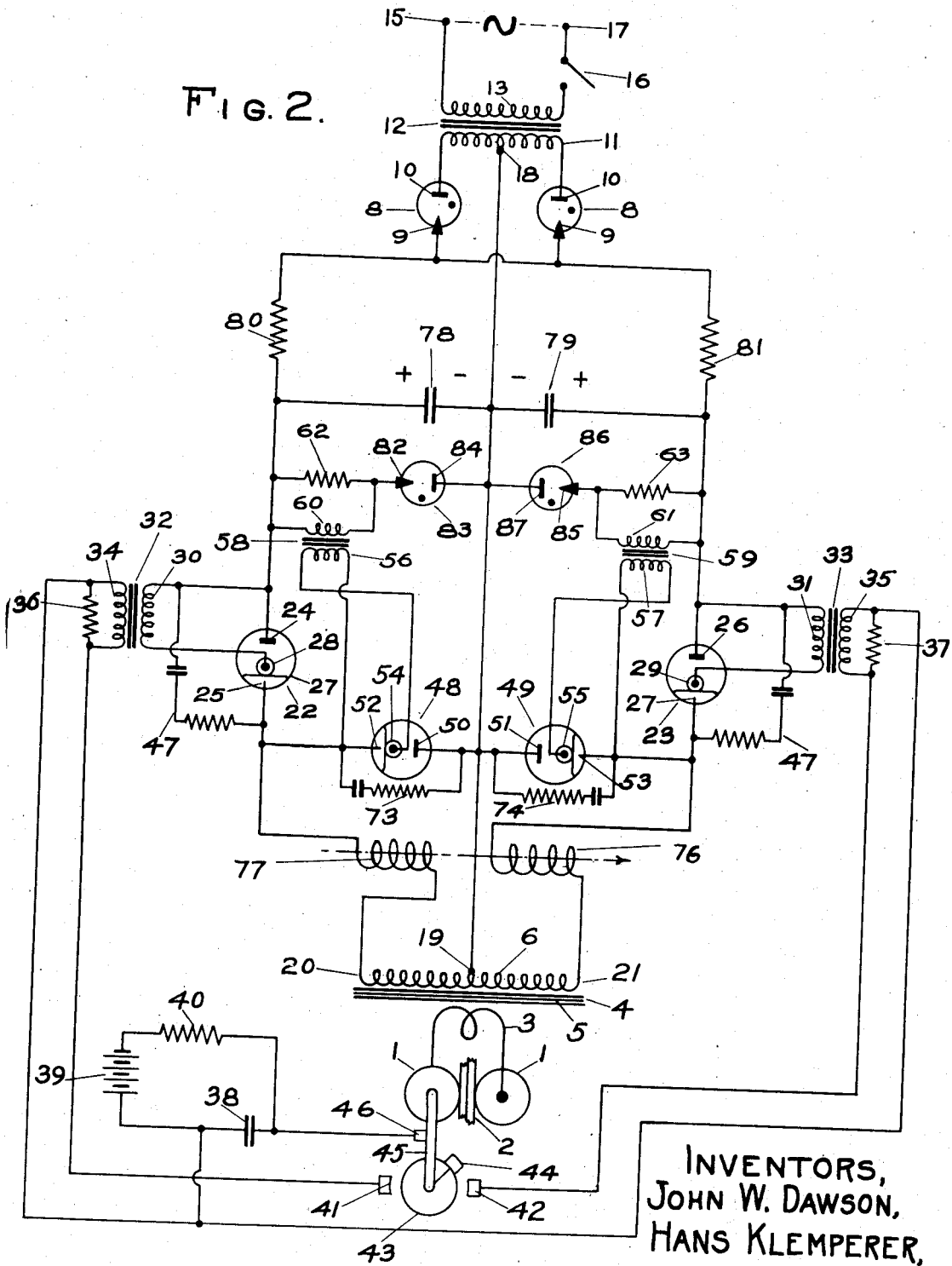

UNITED STATES PATENT OFFICE 2,383,473

WELDING SYSTEM

John W. Dawson, West Newton, and Hans Klemperer, Belmont, Mass., assignors to Raytheon Manufacturing Company, Newton, Mass., a corporation of Delaware Application March 14, 1942, Serial No. 434,671

21 Claims. (Cl. 320—1)

This invention relates to electrical systems, particularly to electrical welding systems of the kind in which intermittent pulses of current are supplied to a load circuit.

In certain welding systems such as those described in the copending application of John Dawson, Serial No. 312,402, filed January 4, 1940, for an improvement in Resistance welding systems, pulses of current are fed alternately in opposite directions through an inductance. If, however, two such pulses of current coincide or overlap they diminish the effective impedance of the inductance, thereby producing a surge of current of relatively high magnitude which results in undesirable effects. Such overlapping is most likely to occur in seam welding systems where it is desired that the welds and the pulses for producing such welds follow each other in rapid succession. The danger of surges of current of undesirable magnitude has heretofore operated as a practical limiting factor in the speed of operation of such seam welding systems.

An object of this invention is the provision of means for preventing undesirable surges of current due to overlapping of succeeding pulses of current.

Another object of this invention is the provision of means which permits rapid operation of systems of the general character described and more particularly of seam welding systems.

Other and further objects of this invention will become apparent and the foregoing objects will be best understood from the following description of exemplifications thereof, reference being had to the drawings, in which Fig. 1 is a schematic diagram of a resistance welding system embodying our invention in which one condenser means is discharged in opposite directions through the welding transformer; and Fig. 2 is a schematic diagram showing another embodiment of our invention in which two condensers are alternately discharged in opposite directions through the welding transformer.

In Fig. 1, welding current is to be supplied to a pair of rotatable welding electrodes or wheels 1 adapted to roll on the work 2 which is to be welded. The current is to be supplied to the electrodes in successive pulses of welding current so as to perform successive welding operations for predetermined angular positions of these electrodes. Each welding operation welds a spot on the work 2, these spots preferably overlapping so as to form a continuous seam welding. The electrodes 1 are connected to the secondary winding of a welding transformer 4. This welding transformer is provided with a core member 5 made of magnetic material. The welding transformer 4 is also provided with a primary winding 6 adapted to be energized by the discharge from the relatively large condenser 7. This condenser is adapted to be charged from any suitable source of direct current, such as a direct current generator, battery, rectifier, or the like. In Fig. 1 the direct current is shown as being supplied from a pair of rectifier tubes 8. These tubes may be of the gas or vapor-filled type having continuously energized cathodes 9. These cathodes may be thermionic filaments or any other suitable type of cathode. The rectifier tubes 8 are provided with anodes 10 which are connected to opposite sides of the secondary winding 11 of a charging transformer 12. The primary winding 13 of the charging transformer 12 has one end thereof connected through an impedance 14 to a terminal 15 and the other end thereof connected through a switch 16 to a terminal 17. The impedance 14 may be a resistance, or if high efficiency is desired may consist of an inductance. The value of the impedance 14 is chosen so as to maintain the proper charging rate of the condenser 7. The terminals 15 and 17 are adapted to be connected to a suitable source of alternating current. The two cathodes 9—9 are connected together to the positive side of the condenser 7. The secondary winding 11 is provided with a center tap 18 which is connected to the negative side of said condenser 7.

The negative side of the condenser 7 is also connected directly to a center tap 19 on the primary winding 6. The positive side of the condenser 7 is adapted to be connected to the left end 20 of the primary winding 6 by a controlled ignition discharge tube 22, and to be connected to the right end 21 of the primary winding 6 by a controlled ignition discharge tube 23. These tubes are preferably of the pool cathode type with an igniter for initiating a cathode spot on the pool in order to cause the tube to conduct current. Although any suitable type of igniter may be used, it preferably is of the kind described and claimed in the copending application of Percy L. Spencer, Serial No. 303,963, filed November 13, 1939, for an improvement in Arc igniting devices, now Patent No. 2,290,897, dated July 28, 1942, consisting of a conductor separated and insulated from the cathode by a thin glass layer. The tube 22 is provided with an anode 24 connected to the positive side of condenser 7, and with a pool cathode 25 connected to the end 20 of primary winding 6. Likewise tube 23 is provided with an anode 26 connected to the positive side of the condenser 7 and with a pool cathode 27 connected to the end 21 of said primary winding 6. The tubes 22 and 23 are also provided with igniters 28 and 29, respectively, preferably of the type explained above. The igniters 28 and 29 are supplied with igniting impulses from secondary windings 30 and 31 of the igniting transformers 32 and 33, respectively. Said igniting transformers are provided with primary windings 34 and 35, respectively. Resistance 36 is connected across the primary winding 34 and resistance 37 is connected across primary winding 35. In order to supply pulses of igniting current to the primary windings 34 and 35, a condenser 38 is provided which is adapted to be charged from a suitable source of direct current, such as a battery 39, connected across said condenser 38 in series with a current-limiting resistance 40. One end of each of the primary windings 34 and 35 is connected to one side of the condenser 38. The other end of the primary winding 34 is connected to a brush 41, while the other end of the primary winding 35 is connected to a brush 42. A contact wheel 43 is provided with an arcuate conducting contact segment 44 which is adapted to make contact with the brushes 41 and 42 upon rotation of said wheel 43. The segment 44 is electrically connected with the shaft 45 which in turn is electrically contacted by a brush 46. Brush 46 is connected to the other side of condenser 38. The contact wheel 43 is adapted to rotate in synchronism with one of the rotating electrodes 1 and for this purpose may be connected with the shaft on which said rotatable electrode 1 is adapted to turn. Of course it will be apparent that shaft 45 and its associated contacts could be replaced by using a suitable timer to supply alternate firing impulses to tubes 22 and 23.

The connection between shaft 45 and the rotating electrode may be made adjustable if desired by providing an adjustable gear box to connect shaft 45 to the shaft on which electrode 1 is arranged. In order to assist the discharge tubes 22 and 23 in starting to conduct current a series circuit 47 consisting of a resistance in series with a condenser is connected across each of said tubes. In order to make each welding current impulse substantially unidirectional with exponential decay, a pair of controlled ignition discharge tubes 48 and 49, preferably of the same type as tubes 22 and 23, is provided. Tubes 48 and 49 are provided with anodes 50 and 51 which are connected together and to the center tap 19 of the primary 16 of the welding transformer 4. Cathodes 52 and 53, preferably of the pool type, are connected to ends 20 and 21, respectively, of the primary winding 6. Tubes 48 and 49 are provided, respectively, with igniters 54 and 55, preferably of the type heretofore described. These igniters are supplied with igniting impulses from the secondary windings 56 and 57 of igniting transformers 58 and 59. The primaries 60 and 61 of transformers 58 and 59 have resistances 62 and 63 respectively arranged across them. One end of each of the primary windings 60 and 61 are connected together and to the negative side of condenser 7, the other end of each primary winding being connected respectively to brushes 64 and 65. These brushes are arranged to make contact at spaced intervals with a conducting segment 66 on a contact wheel 67 arranged on shaft 45 and making electrical contact therewith. Shaft 45 is in electrical contact with brush 46 which is in turn connected with a tap 68 intermediate the ends of a resistance 69. One end of resistance 69 is connected to the negative side of condenser 7, the other end being connected to the anode 70 of a rectifying tube 71. Tube 71 preferably is of the gas filled type having a cathode 72 of the permanently energized type. Cathode 72 is connected to the positive side of condenser 7. To facilitate ignition of shunt tubes 48 and 49 circuits 73 and 74 respectively are arranged across said tubes, each said circuit being comprised of a condenser in series with an impedance.

In order to set the system in operation, the switch 16 is first closed. This causes the rectifier tubes 8 to supply the condenser 7 with direct charging current. The contact wheel 43 rotates upon rotation of the electrodes 1 over the work so that the segment 44 makes contact with one of the brushes 41 or 42. Assuming that contact is made with brush 42, the condenser 38 discharges through the primary 35 of the igniting transformer 33. Thereupon the tube 23 is ignited and current flows between the anode 26 and its associated cathode 27. Thus, the condenser 7 discharges through said tube 23 and supplies a pulse of welding current to the right-hand side of the primary winding 6 and thus to the welding load. This discharge of condenser 7 causes the voltage across it to fall to zero when substantially a maximum of discharge current is flowing from said condenser. Thereupon the potential across the right-hand side of the primary winding 6 tends to reverse due to the inductance of the associated circuit, and the current tends to continue to flow in the same direction. Previous to this time the polarity of the potential across the anode 51 and cathode 53 of tube 49 was such as to oppose igniting of said tube. However, upon reversal of the potential, tube 49 is ready to fire and will fire when an igniting impulse is supplied thereto. When the voltage across the right-hand side of primary 6 reverses, the voltage across condenser 7 also reverses. This reversal of voltage is utilized to supply an igniting impulse to the igniting transformer 59 of tube 49. This impulse is derived through the action of the tube 71 which as stated before is connected in series with resistance 69 and arranged across condenser 7. End 75 of resistance 69 is directly connected to one end of the primary 61 of igniting transformer 59. Tap 68 is connected to the other end of the primary via brush 46, shaft 45, segment 66 of contact wheel 67, brush 65, and intervening connectors when segment 66 is in contact with brush 65. In order to have this circuit ready for the discharge of tube 71 we prefer to make segment 66 of substantial width and to arrange it to make contact with brush 65 before tube 71 fires. Segment 66 because of its width continues to make contact with brush 65 for some time. The discharge of tube 71 therefore determines the exact time at which a pulse of current is supplied to igniting transformer 59. The discharge of tube 71 is in turn dependent upon the reversal of potential of condenser 7, for its anode 70 is connected to the side of condenser 7 which is charged negatively and its cathode is connected to the side charged positively. Only upon reversal of the potential of condenser 7 will tube 71 discharge and supply a pulse to the igniting transformer to thereby ignite tube 49. Thus tube 49 is fired at the proper time. It will be apparent that by providing different values for resistance 69 and changing the position of tap 68 the time of firing of tube 49 can be adjusted. When the tube 49 is fired current flows through the right-hand side of primary 6 and through said tube 49. This current flow causes exponential decay of the current passing through tube 49 to the point where the voltage of the anode 51 is insufficient to maintain ignition of said tube. Thereupon the tube 49 is extinguished.

When tube 23 is extinguished the condenser 7 is then charged by the rectifier. The shaft 45 and contact wheel 43 continue to rotate until the segment 44 makes contact with the brush 41. Thereupon tube 22 is fired in a manner hereinbefore described in connection with tube 23 and after the potential across the left-hand side of the primary 6 of the transformer 4 has been reversed so as to make the anode 50 of tube 48 positive relative to the cathode 52 thereof, the segment 66 of contact wheel 67 being now in contact with the brush 64, tube 71 fires and thereby supplies an igniting impulse to tube 48, whereupon tube 48 fires and current passes therethrough to thereby cause exponential decay of the welding current.

When systems of the character hereinbefore described are used for seam welding it is desirable that the pulses of welding current which are supplied to the primary 6 of the welding transformer in opposite directions follow each other in rapid succession. If, however, any portion of these pulses of current should be supplied to the primary at the same time certain undesirable effects are produced. If, for example, tube 23 conducted current at the same time as tube 22 the effective impedances of the welding load would be substantially diminished or completely by-passed so that a surge of current of undesirable magnitude would occur. This might result in damage to the equipment as well as to the production of an improper weld. Similarly, if tube 23 and tube 48 or tube 22 and tube 49 fired at the same time the effective impedance of the welding load would be diminished, thereby causing undesirable surges of current.

In order to prevent such undesirable surges of current, I prefer to provide suitable impedances in the circuit. For this purpose an air core inductance 76 is interposed in the system and has one end thereof connected to end 21 of the primary 6 and the other end thereof connected to cathode 53 of tube 49 and cathode 27 of tube 23. Likewise an air core inductance 77 is connected between end 20 of primary 6 and cathode 52 of tube 48 and cathode 25 of tube 22. The inductances 76 and 77 may be inductively coupled and co-axially arranged so that when current varies in one of said inductances it induces a counter E. M. F. in the other inductance to thereby oppose similar current variations in said latter inductance. It will thus be seen that in addition to the self-inductance impedance of each of said inductances 76 and 77 their mutual inductance serves to provide added impedance when current is simultaneously varying in each of said inductances.

Each of the inductances 76 and 77 may have an inductance value of the order of one-tenth the total inductance in the circuit of the secondary 3, as reflected in the primary 6. By adding a resistance of relatively small value in series with each of said inductances, the amount of inductance, and therefore the size of each of said inductances, can be substantially reduced, thereby substantially reducing the cost of said inductances without affecting the current limiting effect. Said resistances may be built into the inductances by using a somewhat smaller gauge wire in said inductance or by using a wire having higher specific resistance than copper, such as an iron or nickel wire. Where overlapping of current pulses results in a discharge having a frequency high enough to produce a substantial skin effect, this aids in producing current limitation. Where iron or nickel wire is used the skin effect is substantially increased. By the use of smaller gauge wire a further saving in material is made. It has been found in limiting the current to 2,000 amperes in one arrangement of the type described that, by adding a resistance of ½ ohm to one such inductance, the amount of its inductance can be reduced from $8 \times 10^{-3}$ henries to $5 \times 10^{-3}$ henries. Results of the same order are obtained by adding various other relatively low values of resistance to the inductance. Such resistances dissipate only a comparatively negligible amount of energy during normal welding operation.

From the foregoing it will be seen that we have provided means for preventing the undesirable effects which would otherwise result from the overlapping of pulses of current in such a system. Furthermore it will be seen that we have provided a system adapted for rapid operation and which is particularly desirable for seam welding.

In order further to speed up the operation a pair of condensers could be used in a system in which one condenser is being charged while the other is being discharged. Such an arrangement is shown in Fig. 2 in which the same reference numerals are applied where the elements are identical with those shown in Fig. 1. In the case of Fig. 2 the single condenser 7 of Fig. 1 is replaced by two condensers 78 and 79. The center tap of the secondary 11 of the charging transformer 12 is connected to the negative side of both said condensers, the ends of said secondary being connected to the anodes of rectifier tubes 8. The cathodes of said rectifier tubes are connected together and in series with impedances 80 and 81 are connected to the positive sides of 78 and 79, respectively. The impedances 80 and 81 serve to limit the charging rate of said condensers and take the place of impedance 14 of Fig. 1. Condenser 78 is adapted to be discharged through ignition discharge tube 22 into the left-hand side of the primary 6 of the welding transformer 4. Condenser 79 is likewise adapted to be discharged through ignition discharge tube 23 into the right-hand side of the primary 6 of the welding transformer 4. Said tubes 22 and 23 are adapted to be ignited upon rotation of the electrodes 1 over the work which causes the contact wheel 43 to rotate bringing the conducting segment 44 in contact with either brush 41 or brush 42. Tube 48 as in Fig. 1 is arranged in shunt across the left-hand side of the primary 6, while tube 49 is arranged in shunt across the right-hand side of the primary 6. For igniting tubes 48 and 49, igniting transformers 58 and 59 are provided having their secondaries connected between the igniters 54 and 55 of said tubes, respectively, and the cathodes of said tubes. The igniting transformer 58 has one end of its primary 60 connected to the positive side of condenser 78 and the opposite end thereof connected to the cathode 82 of a rectifying tube 83 which has its anode 84 connected to the negative side of condenser 78. Likewise, the primary 61 of igniting transformer 59 has one end thereof connected to the positive side of condenser 79 and has the other end thereof connected to the cathode 85 of a rectifier tube 86, which has the anode 87 thereof connected to the negative side of condenser 79. Tubes 83 and 86 preferably have cathodes of the continuously energized type, such as for example, thermionic filament cathodes. Resistances 62 and 63 are arranged across primaries 60 and 61, respectively.

When switch 16 is closed and electrode 1 is rotated, contact wheel 43 is also rotated and segment 44 is brought into contact with either brush 42 or brush 41. When said segment comes into contact with brush 42, condenser 38 supplies a pulse of current through the primary 35 of igniting transformer 33, which in turn causes an igniting impulse to be delivered to the igniter 29 of tube 23. Tube 23 thereupon fires discharging condenser 79 therethrough and through the primary 61 of the igniting transformer 59. An igniting impulse is thereby supplied to the tube 49 causing said tube to fire, thus causing exponential decay of the welding current.

After tube 49 is extinguished the condenser 79 is recharged. Meanwhile the contact wheel 43 continues to rotate to make a contact with the brush 41 to thereby discharge condenser 38 through the primary 34 of igniting transformer 32 to thereby ignite tube 22. Thereupon condenser 78 discharges through the left-hand side of primary 6. As the current continues to flow because of the inductance in the circuit the voltage of condenser 78 is reversed and thereupon tube 83 conducts, thereby passing current through the primary 60 of the igniting transformer 58 so as to ignite tube 48. Upon ignition of tube 48, tube 22 is extinguished and the welding current decays exponentially.

As described in connection with Fig. 1, air core inductances 76 and 77 are arranged in the circuit, as has been described in connection with said figure, and these inductances serve to prevent undesirable surges of current due to the coincidence or overlapping of pulses of current going in opposite directions through the primary 6 of the welding transformer. While coincidence of pulses of current going in opposite directions through the primary 6 is the condition which tends to produce the maximum of current surges, overlapping of such pulses also tends to produce undesirably large current surges. In the appended claims the term "overlapping" is used in a broad sense to include also coincidence pulses, which may be considered as 100% overlapping.

While specific details of an embodiment of this invention have been hereinbefore described, it will, of course, be understood that the invention is not limited to these details. Various modifications can be readily made in the light of the teachings of this specification. For example, the protective inductances could be built directly into the welding transformer or might even be comprised in the primary by proper design. The circuits described herein might be readily altered. For example, in Fig. 1 igniting impulses are supplied by means of tube 71 to the shunt tubes 48 and 49 separately, depending upon whether segment 66 is in contact with brush 64 or brush 65. Although supplying igniting impulses separately to shunt tubes 48 and 49 is an added precaution, it is not essential to operation, for although both shunt tubes may simultaneously receive igniting impulses only one shunt tube will be in condition to fire at a given time, the ready shunt tube being the one whose associated series tube has fired and is still conducting current. By supplying igniting impulses simultaneously to both shunt tubes the circuit could be simplified. Contact wheel 67 and brushes 64 and 65 could be eliminated, the ends of the primaries 60 and 61, shown in Fig. 1 as connected to said brushes, being connected directly to tap 68 of resistance 69.

From the foregoing instances it will be seen that modifications will readily suggest themselves to those skilled in the art.

What is claimed is:

1. In combination, a load circuit, electrical energy storage means, means for connecting said electrical energy storage means to said load circuit, a normally effective impedance for limiting the current supplied to the load circuit from said means, means capable of by-passing said normally effective impedance, and independent means for limiting the flow of energy from said energy storage means upon operation of said impedance by-passing means.

2. In an electrical system, a load circuit, means for delivering a pulse of current to the load circuit, a second means for delivering another pulse of current to the load circuit, and means for impeding pulses of current delivered to said load circuit having a low impedance to non-coincident portions of said pulses of current and having a substantially higher impedance to coinciding portions of said pulses of current.

3. In an electrical system, a load circuit and electrical energy storage means connected to said circuit, a normally effective impedance for limiting the current supplied to the load circuit, means for establishing a circuit capable of by-passing said normally effective impedance, and means in said first-mentioned circuit for limiting the flow of electrical energy from said energy storage means upon establishment of said circuit by-passing said normally effective impedance.

4. In an electrical system, a first circuit including a transformer having a tapped primary and a secondary, a load connected to said secondary, a condenser, means for connecting said condenser to one side of the primary to discharge the condenser therethrough, a second circuit including the other side of said primary and means for connecting the ends of said other side of the primary together, and a pair of inductances interposed in said circuits coupled to mutually oppose similar current variations in each other.

5. In combination, electrical energy storage means, a load having a normally effective impedance, a circuit for connecting said storage means to said load to pass a pulse of current through said load, a second circuit for connecting said storage means to said load to pass another pulse of current through said load, and an inductance in each of said circuits, said inductances being coupled to mutually oppose similar current variations in each other.

6. In combination, electrical energy storage means, a load having a normally effective impedance, a circuit for connecting said storage means to said load to pass a pulse of current through said load, a second circuit for connecting said storage means to said load to pass another pulse of current through said load, said second circuit being arranged to shunt the normally effective impedance of the load upon coincidence of pulses of current through said first and second circuits.

7. In combination, a plurality of electrical energy storage means, a load having a normally effective impedance, a circuit for connecting one of said means to said load to pass a pulse of current therethrough in one direction, a circuit for connecting another of said means to said load to pass a pulse of current therethrough in the opposite direction, one of said circuits being arranged to shunt the normally effective impedance of the load upon coincidence of pulses of current through said circuits and an impedance arranged in at least one of said circuits for limiting surges of current therethrough.

8. In an electrical system, a load having normally effective impedance, a plurality of electrical energy storage means, a transformer having a primary winding and a secondary winding, said secondary winding being connected to said load, a circuit for connecting said primary winding to one of said storage means for passing a pulse of current through said primary in one direction, a second circuit for connecting said primary winding to another of said storage means for passing a pulse of current through said primary in another direction, said circuits being arranged to be capable of simultaneously supplying pulses of current to said primary and an impedance arranged in at least one of said circuits for limiting surges of current therethrough.

9. In an electrical system, a load having normally effective impedance, electrical energy storage means, a transformer having a primary winding and a secondary winding, said secondary winding being connected to said load, a circuit for connecting said primary winding to said storage means for passing a pulse of current through said primary in one direction, a second circuit for connecting said primary winding to said storage means for passing a pulse of current through said primary in another direction, said circuits being arranged to be capable of simultaneously supplying pulses of current to said primary and an impedance arranged in at least one of said circuits for limiting surges of current therethrough.

10. In combination, a load having a normally effective impedance, a plurality of electrical energy storage means, a transformer having a secondary connected to the load and a tapped primary, a circuit for connecting one of said storage means to one side of the primary to pass a pulse of current therethrough in one direction, a second circuit for connecting another of said storage means to the other side of the primary to pass a pulse of current therethrough in the opposite direction, said circuits being arranged to be capable of supplying overlapping pulses of current to said primary, and an impedance arranged in at least one of said circuits for limiting surges of current therethrough.

11. In combination, a load having a normally effective impedance, electrical energy storage means, a transformer having a secondary connected to the load and a tapped primary, a circuit for connecting said storage means to one side of the primary to pass a pulse of current therethrough in one direction, a second circuit for connecting said storage means to the other side of the primary to pass a pulse of current therethrough in the opposite direction, said circuits being arranged to be capable of supplying overlapping pulses of current to said primary, and an impedance arranged in at least one of said circuits for limiting surges of current therethrough.

12. In combination, a load having a normally effective impedance, a plurality of electrical energy storage means, a transformer having a secondary connected to the load and a tapped primary, a circuit for connecting one of said storage means to one side of the primary to pass a pulse of current therethrough in one direction, a second circuit for connecting another of said storage means to the other side of the primary to pass a pulse of current therethrough in the opposite direction, said circuits being arranged to be capable of supplying overlapping pulses of current to said primary, and an inductance in each of said circuits, said inductances being coupled to mutually oppose similar current vibrations in each other.

13. In an electrical system, a plurality of electrical energy storage means, a load circuit, a transformer having a tapped primary and a secondary, said secondary being connected to said load circuit, a circuit for connecting one side of said primary to one of said storage means to pass a pulse of current therethrough in one direction, another circuit for connecting the other side of said primary to another of said storage means to pass a pulse of current therethrough in the opposite direction, a plurality of means each of which becomes active upon a tendency for the voltage on its associated storage means to reverse for establishing a shunt circuit across the side of said primary associated with said last-mentioned storage means, and an impedance arranged in series with at least one of said connecting circuits for limiting surges of current therein.

14. In an electrical system, a plurality of electrical energy storage means, a load circuit, a transformer having a tapped primary and a secondary, said secondary being connected to said load circuit, a circuit for connecting one side of said primary to one of said storage means to pass a pulse of current therethrough in one direction, another circuit for connecting the other side of said primary to another of said storage means to pass a pulse of current therethrough in the opposite direction, a plurality of means each of which becomes active upon a tendency for the voltage on its associated storage means to reverse for establishing a shunt circuit across the side of said primary associated with said last-mentioned storage means, and an inductance arranged in series in each of said connecting circuits, said inductances being coupled to mutually oppose similar current variations in each of said inductances.

15. In an electrical system, electrical energy storage means, a load circuit, a transformer having a tapped primary and a secondary, said secondary connected to the load circuit, a circuit for connecting one side of the primary to said electrical energy storage means to pass a pulse of current therethrough in one direction, another circuit for connecting the other side of the primary to said electrical energy storage means to pass a pulse of current therethrough in the opposite direction, a plurality of means each of which becomes active upon a tendency for the voltage on said electrical energy storage means to reverse for establishing a shunt circuit across the side of said primary associated therewith, and an impedance arranged in series in each of said connecting circuits, said impedances being coupled to mutually oppose similar current variations in each other for limiting surges of current in said circuits.

16. An electrical system including an inductance, circuits for supplying pulses of current in opposite directions and in overlapping relation through said inductance, and a pair of coupled inductances for limiting surges of current in said circuits whenever oppositely directed pulses of current in said circuits overlap.

17. In an electrical system, a transformer, means for supplying pulses of current in opposite directions through said transformer, and a pair of inductances coupled to mutually oppose similar current variations in each other to thereby limit surges of current in said system whenever two oppositely directed pulses of current through said transformer overlap.

18. In an electrical system, a load circuit, means for delivering a pulse of current to the load circuit, a second means for delivering another pulse of current to the load circuit in the opposite direction to said first-mentioned pulse of current, and means for impeding pulses of current delivered to said load circuit and having substantially increased impedance only to coinciding portions of oppositely directed pulses of current.

19. In an electrical system, a transformer, means for delivering a pulse of current to said transformer, a second means for delivering another pulse of current to said transfromer in the opposite direction to said first-mentioned pulse of current, and means for limiting the magnitude of only the coinciding portions of said pulses of current delivered to said load.

20. In an electrical system, a load circuit including a transformer, means for delivering a pulse of current through a portion of said transformer, a second means for delivering another pulse of current in the opposite direction to said first-mentioned pulse of current and through another portion of said transformer, and means for impeding pulses of current delivered to said load circuit and having substantially increased impedance only to coinciding portions of said pulses of current.

21. In an electrical system, a load circuit, means for delivering a pulse of current to the load circuit, a second means for delivering another pulse of current to the load circuit in the opposite direction to said first-mentioned pulse of current, and means for limiting the magnitude of only the coinciding portions of said pulses of current delivered to said load.

JOHN W. DAWSON.
HANS KLEMPERER.

CERTIFICATE OF CORRECTION.

Patent No. 2,383,473.                           August 28, 1945.

JOHN W. DAWSON, ET AL.

It is hereby certified that error appears in the printed specification of the above numbered patent requiring correction as follows: Page 5, second column, line 8, claim 12, for "vibrations" read --variations--; page 6, second column, line 20, claim 19, for "transfromer" read --transformer--; and that the said Letters Patent should be read with this correction therein that the same may conform to the record of the case in the Patent Office.

Signed and sealed this 4th day of December, A. D. 1945.

Leslie Frazer (Seal)                                  First Assistant Commissioner of Patents.